Nov. 22, 1932.    A. N. CRAMER    1,888,309
CONVEYER
Filed May 4, 1928    2 Sheets-Sheet 1
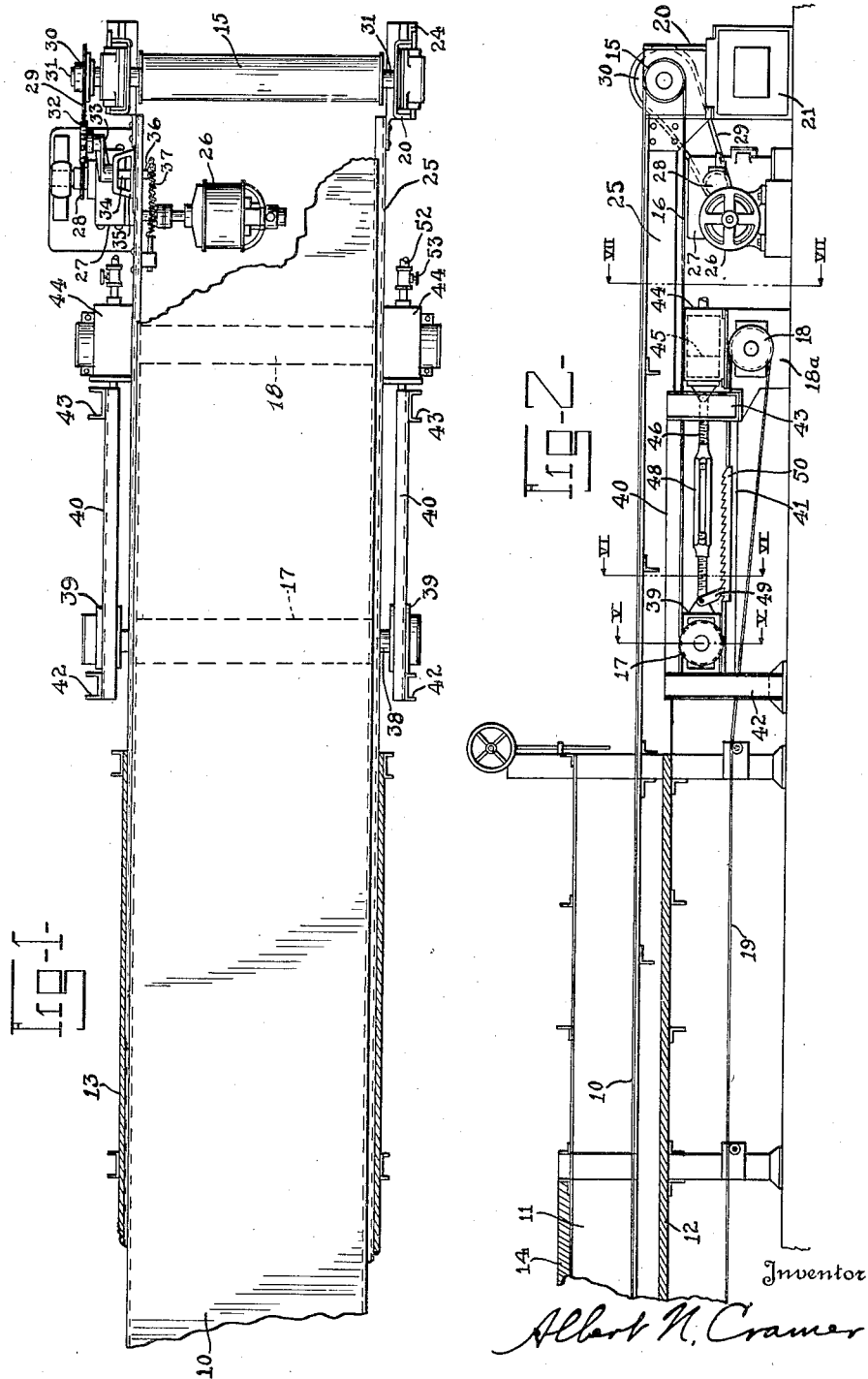
Inventor
Albert N. Cramer
By
J. F. Rule,
Attorney Nov. 22, 1932.     A. N. CRAMER     1,888,309
CONVEYER
Filed May 4, 1928     2 Sheets-Sheet 2
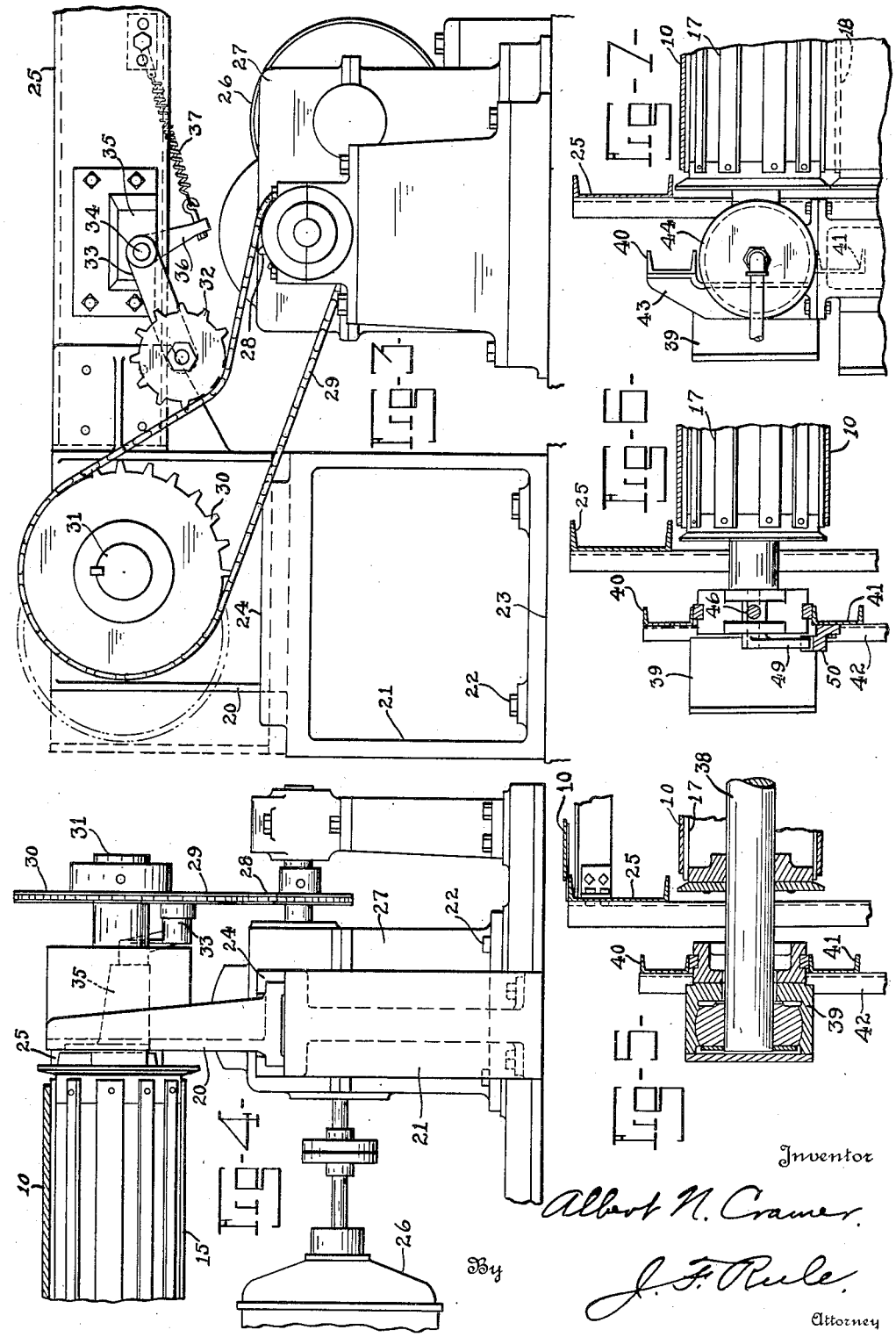

Patented Nov. 22, 1932

1,888,309

UNITED STATES PATENT OFFICE

ALBERT N. CRAMER, OF TOLEDO, OHIO, ASSIGNOR TO OWENS-ILLINOIS GLASS COMPANY, OF TOLEDO, OHIO, A CORPORATION OF OHIO

CONVEYER

Application filed May 4, 1928. Serial No. 274,987.

My invention relates to apparatus which, in the form herein illustrated, is adapted for conveying ware through an annealing leer, and, more specifically, to tension and take-up mechanism for an endless conveyer by which ware is carried through a leer tunnel, although the invention may be used in connection with other forms of belts, conveyers and the like, and in association with apparatus other than annealing leers.

In an annealing leer of the type herein disclosed, the ware to be annealed is carried through the leer tunnel on an endless conveyer which is of considerable length and may consist, either of a multiplicity of metal links or sections hinged together, or a woven wire fabric, or other construction. The conveyer in passing through the annealing chamber is subjected to a high temperature, causing expansion and lengthening of the conveyer. This combined with the great tension or pull that is necessary to drive the conveyer, results in substantial elongation and fluctuations in the length of the conveyer.

An object of the present invention is to provide suitable means for taking up the slack in the conveyer, maintaining a suitable tension thereon and permitting contraction without placing undue strain on the conveyer when the temperature is reduced.

In leers of the type indicated, it has been customary to mount the motor for driving the leer conveyer, on the framework which supports the conveyer. This frame is subject to temperature changes through a wide range, causing expansion and contraction in the direction of its length, and owing to the great length of the frame results in shifting the motor through a considerable range of movement. In accordance with the present invention, the driving motor has a stationary mounting and has driving connection with the leer conveyer through a belt or chain, suitable tension and take-up mechanism being provided to compensate for shifting of the conveyer driving roll relative to the motor.

Other features of the invention will appear hereinafter.

In the accompanying drawings:

Fig. 1 is a part sectional plan view of apparatus constructed in accordance with the present invention, parts of the apparatus being broken away.

Fig. 2 is a part sectional elevation of the same.

Fig. 3 is a side elevation of apparatus shown in Fig. 1, and particularly of the motor, its driving connections with the belt conveyer, and the tension and take-up mechanism between the motor and said conveyer.

Fig. 4 is an end elevation partly in section of mechanism shown in Fig. 3.

Figs. 5, 6 and 7 are fragmentary views in sectional elevation, the sections being taken, respectively, at the lines V—V, VI—VI and VII—VII on Fig. 2.

Referring to the drawings, an endless conveyer 10 is provided for conveying glass articles or other ware through the annealing leer. The leer comprises a tunnel 11 of considerable length having a floor 12, side walls 13 and roof or cover 14. The leer and leer conveyer may be of the construction particularly set forth in my co-pending application, Serial Number 281,254, filed May 28, 1928.

In the present application, I have shown only the delivery end of the leer and the apparatus associated therewith. The leer conveyer 10 entends forwardly over a driving roll 15 and comprises a lead 16 extending from the roll 15 rearwardly to a tension and take-up roll 17. From the roll 17, the conveyer extends forwardly to and over a roll 18 supported in standards 18ª. From the roll 18, the return reach 19 of the conveyer extends rearwardly through the leer beneath the floor 12.

The driving roll 15 is provided at its ends with bearing shafts 31, journalled in bearing plates or standards 20 which, as shown in Figs. 3 and 4, are slidably mounted on standards 21 which may be secured by bolts 22 or the like to a floor or foundation 23. The standards 21 are provided with guideways 24 permitting sliding movement of the bearing plates 20 in a direction lengthwise of the leer. The bearing plates 20 are fixed to the forward ends of the frame pieces or side rails 25 which extend lengthwise of the leer.

The leer conveyer 10 is driven by an electric motor 26 having a stationary mounting. The base of the motor may be bolted or otherwise secured to the floor 23. The motor operates through suitable speed reduction gearing mounted in the gear box 27 to drive a sprocket wheel 28. A sprocket chain 29 runs over the wheel 28 and a sprocket wheel 30 keyed to the shaft 31 of the driving roll 15.

Tension and take-up mechanism for the sprocket chain or belt 29 comprises a take-up wheel 32 engaging the chain, said wheel being carried at the outer end of a crank arm 33 fixed to a crank shaft 34 mounted in a bracket 35 fixed to the frame 25. A rock arm 36 also fixed to the shaft 34 is connected at its outer end to one end of a tension spring 37, the other end of which is anchored to the frame 25. It will be seen that with this construction, the spring 37 holds the take-up wheel 32 with a constant tension against the drive chain 29 to take up any slack therein when the roll 15 is shifted by expansion or contraction of the leer frame.

In order to maintain a constant and uniform tension on the leer conveyer 10 and take up any slack therein as the conveyer is lengthened by expansion due to rise in temperature and by stretching of the conveyer, additional tension and take-up mechanism is provided, as will now be described.

The take-up roll 17 is mounted on a shaft 38 which is journalled in bearing blocks 39 (Figs. 1, 2 and 5) slidably mounted in a stationary frame comprising upper and lower angle irons or frame members 40 and 41 fixed at one end to a standard 42 and at the opposite end to a frame piece 43 supported on the standard 18ª. This construction permits the roll 17 to be moved lengthwise of the leer for taking up slack in the conveyer 10. In order to effect such movement of the roll 17, there is provided a tension and take-up device at each end of the roll. As these devices are substantially identical in construction, a description of one will suffice for both.

Each said device comprises an air motor 44 having a piston 45 connected through a sectional rod 46 to the bearing block 39 in which the shaft 38 of the take-up roll is journalled. A turn buckle 48, which may be of usual construction, has a threaded connection with the right and left hand screw threads formed on the respective sections of the rod 46. A pawl 49 carried on the block 39, engages the teeth of a rack bar 50 which may be carried on the frame piece 41. Air under pressure is supplied to the air motor through a pipe 52 (Fig. 1). The air pressure may be cut off from the motor by a valve 53.

The air motors operate through the rods 46 to continuously apply a substantially constant pressure to the bearing blocks 39 so that the take-up roll 17 operates to take up any looseness or slack in the leer conveyer 10 and maintains a continuous tension thereon. The pawl and ratchet devices 49, 50 may serve to hold the take-up roll 17 against retrograde movement so that tension on the conveyer may be maintained without a continuous application of the air pressure. The valves 53 may be opened, for example, when the leer is being heated up or whenever any looseness of the leer conveyer occurs and thereby permit the air motors to take up the slack and apply suitable tension to the conveyer. The pawl and ratchet devices will then serve to maintain such tension, permitting the air to be shut off from the motors.

The turn buckles 48 in conjunction with the pawl and ratchet devices may be used to increase the range through which the take-up roll can be moved by the air motors, as will appear from the following description: When the conveyer is contracted to its shortest length, the piston 45 (Fig. 2) will be at the right hand end of the motor. The rod 46 will also be contracted to its shortest length and the roll 17 will be in a forward position, the pawl 49 being near the right hand end of the rack 50. As the conveyer lengthens, the pistons 45 will advance. The extent of this movement, of course, is limited by the length of the motor cylinders. When the pistons have reached their limit of such movement, the turn buckles can be operated to lengthen the rods 46 and return the pistons to the forward or right hand ends of the cylinders while the roll 17 is held against retrograde movement by the pawls 49, which by this time have reached a position about midway along the racks 50. The pistons may now operate again to take up additional slack in the conveyer. While the turn buckles are being adjusted, the air pressure may be cut off from the motors so that they will offer no resistance to such adjustment, the pawls 49 serving at this time to hold the take-up roll 17. If desired, the pawls 49 may be thrown out of engagement with the racks and the air motors alone be relied on to maintain tension on the conveyer. The air motors will then serve also as a safety device to prevent any excessive tension when the conveyer contracts on account of a lowering of the temperature in the leer. The tension on the leer may evidently be regulated by regulating the air pressure supplied to the motors.

Modifications may be resorted to within the spirit and scope of my invention.

What I claim is:

1. The combination of a roll, a support on which said roll is mounted for movement in a direction transverse to its axis, an element running over said roll and tending to move it in said direction, a tension device opposing said movement, said tension device comprising a piston motor including a piston movable in said direction, means for transmitting movement of the piston to said roll, and manually releasable means operating independently of the motor to secure the roll against movement in the opposite direction.

2. The combination of a rotary shaft, a bearing block in which said shaft is journalled, a support in which said block is mounted for movement in a direction perpendicular to the shaft, a piston motor, a connecting rod between the motor piston and said block, and manually releasable means operating independently of the motor to secure the block against movement in the opposite direction.

3. The combination of a rotary element, a support in which said element is mounted and movable in a direction transverse to its axis of rotation, a piston motor, a connection between the motor piston and said element for moving it in one direction, and a pawl and ratchet mechanism preventing movement of said element in the reverse direction.

4. The combination of a shaft, a bearing block in which the shaft is mounted, a support in which the bearing block is slidably mounted for movement in a direction perpendicular to the axis of said shaft, a piston motor, a sectional rod connecting the motor piston and said block, a turn buckle connecting the sections of said rod, a stationary rack, and a pawl connected to move with said bearing block and engaging the rack.

5. The combination of an endless belt, rolls over which said belt runs including a tension and take-up roll, automatic means for continuously applying pressure to the take-up roll for taking up slack and applying tension to the belt, and a pawl and ratchet device for locking the roll against retrograde movement.

6. The combination of a roll, tension and take-up mechanism including a piston motor, power transmitting mechanism between the motor piston and the roll operative to move the roll in a direction perpendicular to its axis during the movement of the piston in one direction, and means to hold the roll against retrograde movement during the return movement of the piston.

7. The combination of a roll, tension and take-up mechanism including a piston motor, power transmitting mechanism between the motor piston and the roll operative to move the roll in a direction perpendicular to its axis during the movement of the piston in one direction, means to hold the roll against retrograde movement during the return movement of the piston, and adjusting means whereby the piston after its return movement is operable during its next forward movement to effect a continued movement of said roll.

8. The combination of a roll, a flexible element running over said roll, means for moving the roll in a direction perpendicular to its axis for taking up slack in said element, said means including a piston motor having a reciprocating piston, means for causing successive forward movements of the piston to advance the roll, and means for holding the roll against retrograde movement during the return movements of the piston.

9. The combination of a roll, a flexible element running thereover, bearing blocks in which said roll is journalled, said blocks shiftable in a direction to maintain pressure of said roll against said element, means for applying pneumatic pressure to said blocks in said direction, and manually releasable devices operating independently of the pressure applying means to hold the blocks against movement in the opposite direction.

10. The combination of a roll, a flexible element running thereover, means for applying pneumatic pressure to said roll in a direction to maintain said element under tension, and manually releasable devices operating independently of the pressure applying means for maintaining pressure applied to said roll.

Signed at Toledo, in the county of Lucas and State of Ohio, this 2nd day of May, 1928.

ALBERT N. CRAMER.